(12) United States Patent
Kopp

(10) Patent No.: US 6,955,088 B2
(45) Date of Patent: Oct. 18, 2005

(54) SENSOR, PARTICULARLY A PRESSURE SENSOR WITH A SENSOR FASTENING DEVICE

(76) Inventor: Thomas Kopp, Sonnhalde 8, D-77709 Wolfach (DE)

( * ) Notice: Subject to any disclaimer, the term of this patent is extended or adjusted under 35 U.S.C. 154(b) by 11 days.

(21) Appl. No.: 10/885,505

(22) Filed: Jul. 7, 2004

(65) Prior Publication Data

US 2005/0103116 A1    May 19, 2005

(30) Foreign Application Priority Data

Nov. 14, 2003  (DE) ................................ 103 53 323

(51) Int. Cl.⁷ ............................................. G01L 7/00
(52) U.S. Cl. ...................................................... 73/706
(58) Field of Search ........................... 73/706, 714–728, 73/756; 137/469, 624.14

(56) References Cited

U.S. PATENT DOCUMENTS

| | | | | |
|---|---|---|---|---|
| 5,844,137 A | * | 12/1998 | Carson | 73/216 |
| 6,209,399 B1 | * | 4/2001 | Probst et al. | 73/756 |
| 6,311,561 B1 | * | 11/2001 | Bang et al. | 73/708 |
| 6,508,131 B2 | * | 1/2003 | Frick | 73/756 |
| 6,742,386 B1 | * | 6/2004 | Larson | 73/146.4 |

FOREIGN PATENT DOCUMENTS

| | | |
|---|---|---|
| DE | 42 13 857 A1 | 10/1993 |
| DE | 42 34 290 A1 | 4/1994 |
| DE | 44 07 212 C1 | 8/1995 |
| DE | 196 28 551 A1 | 2/1997 |
| EP | 0 403 257 B1 | 3/1994 |
| EP | 0 723 143 B1 | 5/1998 |

\* cited by examiner

Primary Examiner—William Oen
(74) Attorney, Agent, or Firm—Nath & Associates PLLC; Gregory B. Kang; Teresa M. Arroyo

(57) ABSTRACT

The invention relates to a pressure sensor (1) with a housing (2), a sensor device (4), a sensor fastening device (8, 8b) for fastening the sensor device (4) onto and/or in the front area of the housing (2), and a seal (7) for sealing the transitional area between the housing (2) and the sensor device (4), where the housing (2) exhibits an inside housing wall (2W) and the sensor device (4) exhibits an outside sensor device wall (4W), such that the housing wall (2W) and the sensor device wall (4W) run in adjacent fashion one to the other and exhibit between the housing wall (2W) and the sensor device (4W) a reception space (6) for receiving the seal (7). Small dimensions are advantageously achieved in that the sensor fastening device exhibits the reception space (6) and the seal (7), and the seal (7) between the housing wall (2W, 2W*) and the sensor wall (4W) is mounted in such a way that the seal (7) creates an effective force (F) in the direction of the housing wall (2W, 2W*) and the sensor wall (4W), and the two are braced against each other by the force (F). The invention also relates to a corresponding process for mounting a pressure sensor of this kind.

12 Claims, 2 Drawing Sheets

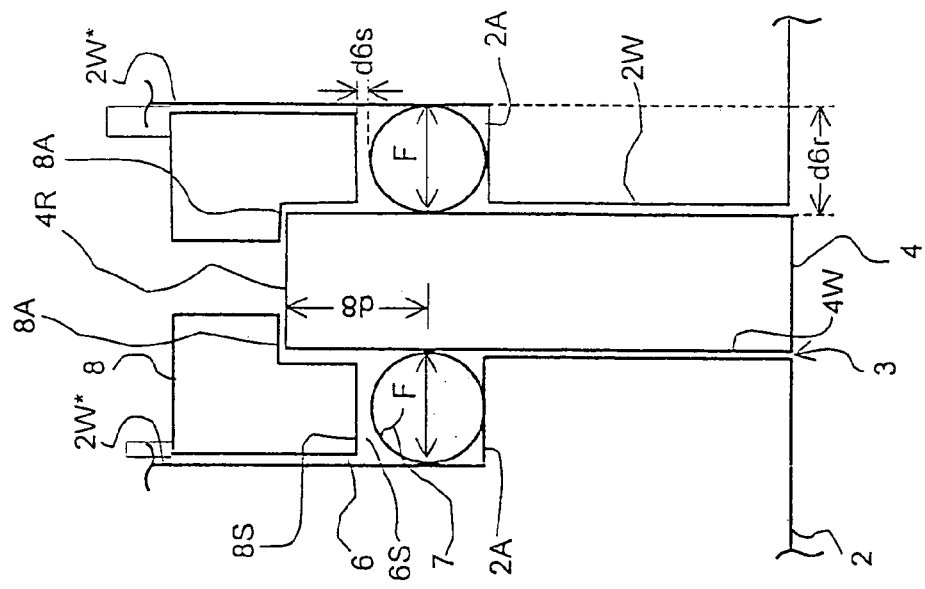
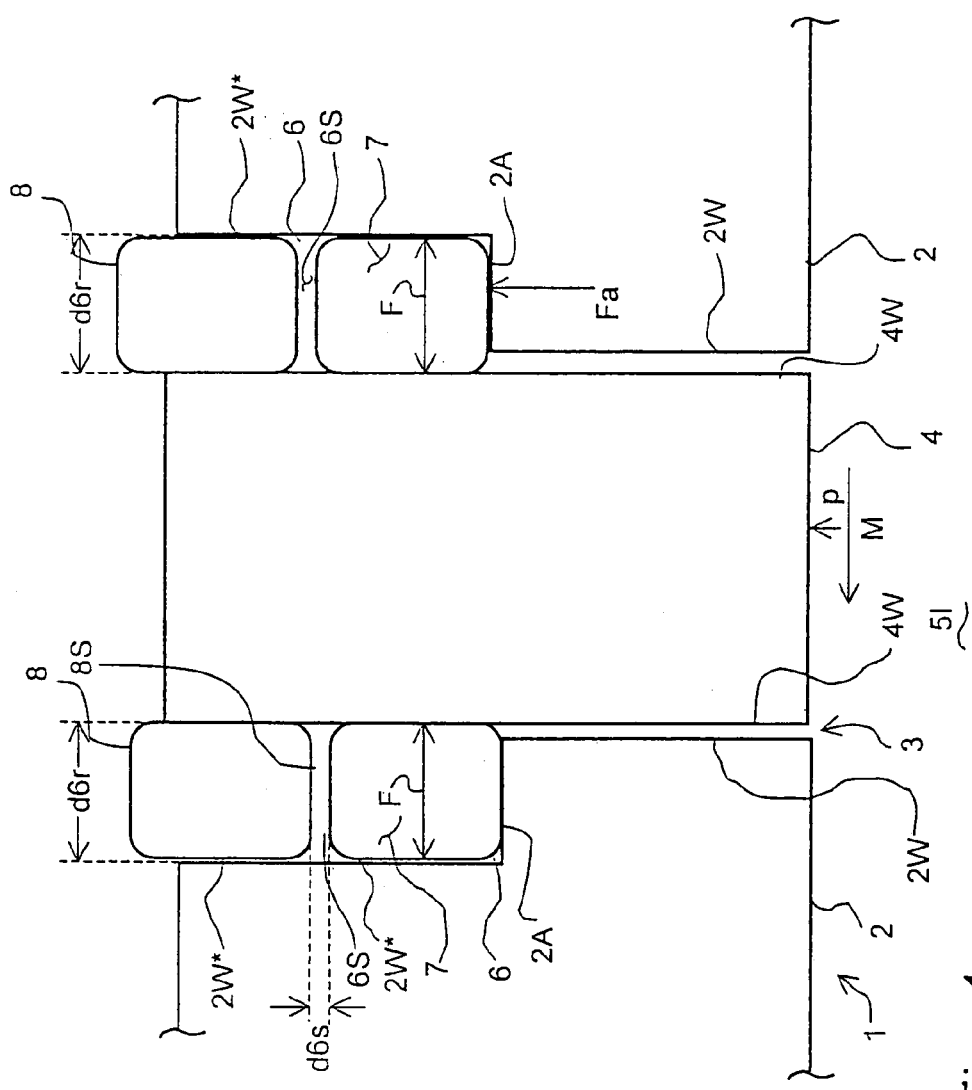

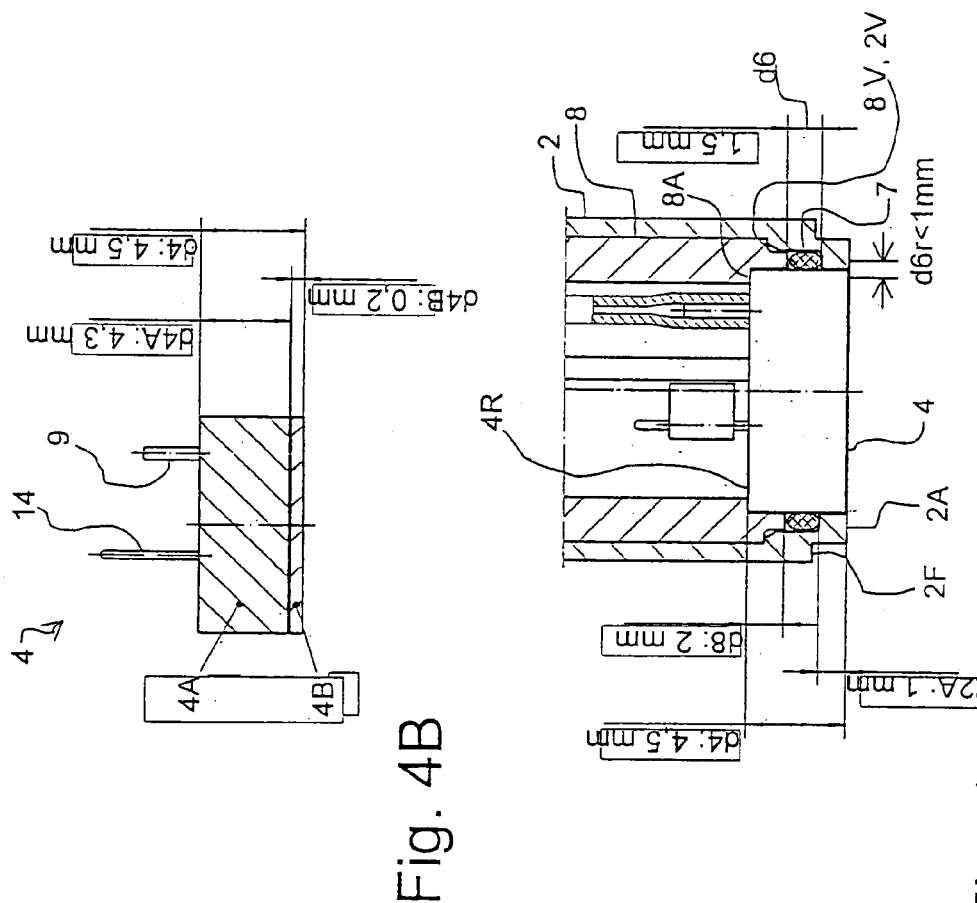
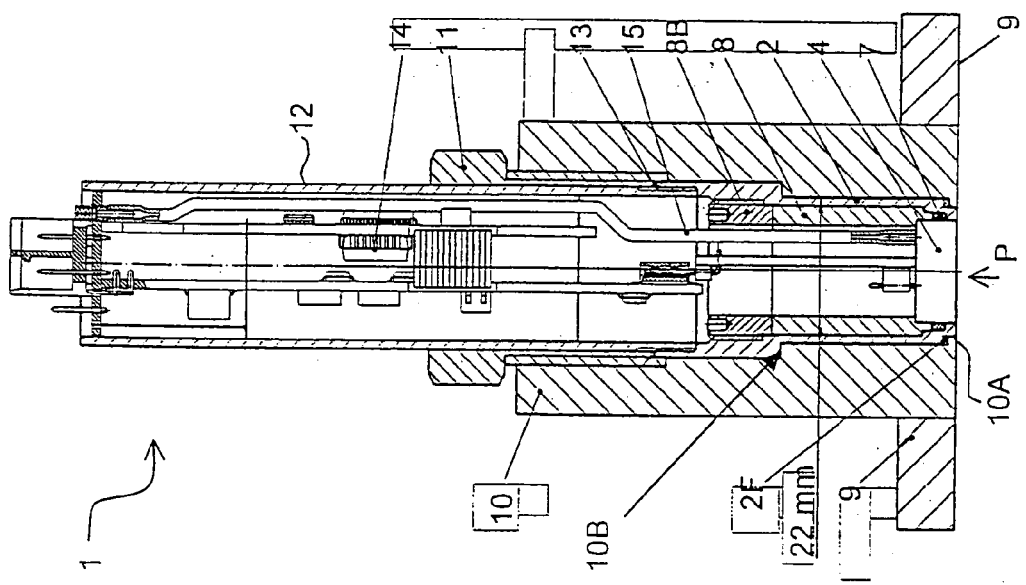

SENSOR, PARTICULARLY A PRESSURE SENSOR WITH A SENSOR FASTENING DEVICE

BACKGROUND OF THE INVENTION

The invention relates to a sensor, particularly a pressure sensor with a sensor fastening device for fastening a sensor device to the front area of a housing, and relates to a process for mounting a pressure sensor.

BRIEF SUMMARY OF THE INVENTION

Generally known are pressure-measuring devices with a housing, a sensor device with a fastening device for attaching the sensor device on, or in, the front area of the housing, and a seal for sealing the transitional area between the housing and the sensor device. Sensors of this kind are installed, e.g., in the wall of a receptacle in order to determine parameters relating to the receptacle contents or the receptacle interior. The front-end of the housing, where the fastened sensor device is open toward the front, is used to install the housing in a through-hole in the receptacle wall. The housing is ideally fastened to the wall of the receptacle by means of screw connections or a welded flange.

Known are sensors or pressure-measuring devices with a ceramic capacitive pressure sensor element consisting of a base and a even diaphragm. The base is installed at the back-end, i.e. toward the process attachment, and is thus reinforced against the pressure exerted by the medium being monitored in the receptacle. The base serves to fasten the actual pressure sensor element in the attachment and to fasten a diaphragm, which bends along a given path under the influence of the pressure being measured. The inflection at two electrodes located between the diaphragm and the base results in a capacitive change, which is processed via electrical lines and an electronic evaluation unit into a current signal or a digital value. The outer diameter of these capacitive pressure sensor elements is currently not less than the 17.5 mm of the housing attachment outer diameter, since a very thin diaphragm must be used for the measurement of small hydrostatic pressures, and this is expensive for series manufacture and is thus uneconomical.

Also known are poly-silicon pressure sensors, which are employed in connection with a pressure-mediating liquid.

Also known are pressure-measuring devices with, e.g., a G 1.5 threaded connection and a frontally flush pressure sensor device, where the pressure sensor device is installed without a back-fitting device for fastening. Minimal back-fittings are technically possible, ideally up to 0.04 mm. The frontally flush feature is particularly important for measurements performed in media where deposits can form due to a large back-fitting and can lead to incrustations or the buildup of impurities, e.g., in foodstuff production, where this ultimately reduces the storage life of the foodstuff.

The housing circumference in the frontal area of a pressure sensor—a circumference which corresponds to an opening in the wall of the receptacle in which the pressure is being measured—is different depending on the type of pressure sensor. Known are pressure sensors with a frontally flush ceramic capacitive sensor device, whose circumference has a sensor diameter of 28 mm. Pressure sensors with a diaphragm on the electrodes results in a capacitive change.

The goal of the invention is to propose a pressure sensor with a housing and a sensor device installed on front end of the housing, which make it possible to reduce the overall diameter, or make it possible to enlarge the diameter of the sensor device relative to the outer diameter of the housing.

Preferred is a pressure sensor with a housing, a sensor device, a sensor fastening device for fastening the sensor device onto and/or in the front area of the housing, and a seal for sealing the transitional area between the housing and the sensor device, where the housing exhibits an inside housing wall and the sensor device exhibits an outside sensor device wall, such that the housing wall and the sensor device wall run in adjacent fashion one to the other, forming a reception space for receiving the seal. The sensor fastening device exhibits the reception space and the seal. The seal is set between the housing wall and the sensor device wall in such a way that the seal creates an effective force in the direction of the housing wall and the sensor device wall and braces the two against each other.

Also preferred is a corresponding process for mounting a pressure sensor in which a sensor device is positioned on the front of, or in, a housing, a seal is installed in a reception space between an inside wall of the housing and an adjacent lateral sensor device wall of the sensor device, and the sensor device is secured to the housing, where the seal is given dimensions appropriate to the dimensions of a reception space and is pressed into the reception space between the sensor device wall and the housing wall, so that the seal exerts a pressure force (F) on the sensor device and the housing, such that the two are braced against each other.

Because the seal is mounted in a way that subjects it to deformation, the seal tends to expand in a lateral direction. Particularly in the case of a cylindrical arrangement and the use of an O-ring as a seal the only effective possibility left to the seal is to extend itself in the direction of the housing wall and the sensor wall opposite the housing wall. These walls are pressed apart by the lateral force at work on them. Since the sensor device is installed inside the housing, however, it cannot be moved away from the housing wall. As a result the sensor device is ultimately braced into position inside the housing, or inside the ideally cylindrical housing wall, by the forces at work in the mounted seal. Naturally one portion of the sensor device can also project from the front end of the housing, so that the sensor device is then positioned on the frontal area, i.e., only partially on the frontal area of the housing.

Mounting or bracing the seal should also be understood to include mounting by forces that act not only perpendicular to the wall but also at angles diagonal to the walls. The more the bracing force of the seal acts in a perpendicular fashion relative to the walls, the better is the bracing of the sensor device and the housing relative to each other.

Preferred is a pressure sensor in which the housing exhibits an abutment for the seal in the front-end direction and this abutment takes the form of a projecting part that restricts the seal and points forward and inward toward the sensor device wall, and/or the sensor device exhibits a forward projecting part that limits the seal and is directed toward the housing wall.

Particularly preferred is a pressure sensor in which the length of the reception space for the seal in the lateral direction between the housing wall and the sensor device wall is smaller than the corresponding length of the unmounted seal. The relaxed seal is thus wider than the reception space and is compressed upon insertion into the reception space. This creates the force inside the seal that acts against the neighboring walls.

Preferred is a pressure sensor for which there remains an open space rearwards of the seal when the seal is braced between the housing wall and the sensor device wall, such that the open space leads to the adjacent housing components on the back-end. This space prevents the seal from being crushed by excessive axial tightening forces acting on the seal.

Preferred is a pressure sensor in which the sensor fastening device exhibits an adjusting device with a section that limits the reception space and that is adjustably positioned, at least in part, between the housing wall and the sensor device wall in the direction of the seal.

Preferred is a pressure sensor in which the adjusting device exhibits an outer thread to be screwed into an inner thread of the housing, specifically the housing wall. The outer thread and the inner thread engage with each other in such a way that the reception space limiting section of the adjusting device can be moved in the direction of the seal, and particularly can be tightened against the seal as a tightening section. By means of the tightening section the seal can be tightened and compressed in a direction different from that of the sensor device wall, so that the seal expands in the direction of the sensor device wall and in the direction of the housing wall and exerts a pressure force that braces the sensor device and the housing relative to each other. This advantageously makes use of the fact that the seal exhibits a conventional elastic property and is deformed in a specific direction when compressed by an external force. The deformation brings about an expansion in the seal in a direction lateral to the effective force. The tightening force exerted axially on the seal is thereby deflected laterally to the opposite walls, i.e., the housing wall and the sensor device wall. This design can thus be used as an alternative to, or in addition to, a seal used in a reception space that is smaller than the relaxed seal.

Preferred is a pressure sensor in which the adjusting device exhibits a inside abutment that is coupled to the housing and that comes to rest against a back-end segment of the sensor device, in order to limit the insertion depth of the sensor device (4) into the housing (2).

Preferred is a pressure sensor in which the adjusting device has an outside abutment that comes to rest on an inside projecting part that limits the fastening device and belongs to the housing, in order to limit the advance of the adjusting device in the forward direction.

Preferred is a pressure sensor in which the sensor device exhibits a ceramic capacitive pressure sensor element with an outer diameter less than or equal to 18 mm.

Preferred is a pressure sensor in which the housing exhibits an outer diameter of 20–25 mm, particularly 22 mm.

Preferred is a pressure sensor in which the reception space for the seal is higher in the axial direction than the axial length of the seal, particularly by a factor of 1.5, an inside abutment belonging to the sensor fastening device opposite a forward tightening section for tightening the seal in the axial direction is positioned at a distance that is larger by a certain length than the corresponding dimension of the seal, particularly larger by 2 mm or more, and an axial length from the inside abutment to the front tightening section of the sensor fastening device, plus the axial length of the seal reception space for the seal, plus a length of a seal limiting projection taken together are equal to the axial length of the sensor device.

BRIEF DESCRIPTION OF THE SEVERAL VIEWS OF THE DRAWINGS

An exemplary embodiment of the invention, along with modifications, is next explained in greater detail on the basis of the drawing, which shows:

FIG. 1 a partial sectional view through a front segment of a pressure sensor;

FIG. 2 a frontal section of a pressure sensor according to a modified embodiment;

FIG. 3 a sectional depiction through a pressure sensor according to another modification, where the pressure sensor is installed in a receptacle;

FIG. 4A an enlarged frontal section of the pressure sensor of FIG. 3; and

FIG. 4B a sectional depiction of an enlarged pressure sensor device.

DETAILED DESCRIPTION OF THE INVENTION

FIG. 1 shows a highly schematized version of the front section of a pressure sensor 1. The pressure sensor 1 exhibits a housing 2 with a hole 3 on its front end; a sensor device 4 is installed in the front hole 3. The front-end of the sensor device 4 exhibits a diaphragm by means of which a pressure p can be recorded—the pressure that is at work in a receptacle interior 5I containing a medium M. The medium flows along the front end of the pressure sensor 1. The front-end hole 3 of the housing 2 is formed by a housing wall 2W, which will ideally exhibit a cylindrical circumference. The sensor device 4 exhibits a lateral sensor device wall 4W, which has an outer circumference that corresponds in shape to the inside housing wall 2W. Ideally the dimensions of the housing wall 2W and the sensor device wall 4W will be coordinated so that when they are assembled a gap does not remain between them, into which the material of medium M could penetrate from the receptacle interior 5I.

In a section positioned at a distance from the front end the housing 2 exhibits a wall 2W* that recedes from the outer circumference of the sensor device 4. As a result, a projecting part 2A that points forward and inward, i.e., toward the front-end hole 3, and that has an abutment area on its back end is formed between the front end of the receding housing wall 2W* and the back end of the front housing wall 2W. This projecting part and the abutment area 2A form a seal-limiting projection 2A.

Formed on the back end of the seal-limiting projection 2A and between the receding housing wall 2W* and the sensor device wall 4W is a seal reception space 6, in which a seal 7 is installed. The seal 7 will ideally be an O-ring, which runs around the sensor device 4 and through the seal reception space 6; the seal reception space 6 ideally will be cylindrical in shape. In an already known manner the seal 7 serves to close off the transitional area between the housing wall 2W, 2W*, and the sensor device wall 4W.

In mounting the sensor the dimensions of the seal 7 and the seal reception space 6 are coordinated in order to secure, and particularly to temporarily fasten, the sensor device 4 in the front-end hole 3 of the housing 2. In accordance with a preferred embodiment a lateral or—in the case of a cylindrical design—the radial length d6r of the seal reception space 6 will be smaller than the corresponding length of the relaxed seal 7. In the case of an O-ring acting as seal 7, this length is understood to be the diameter of a section through the rubber or seal body. By inserting the seal 7 into the narrower seal reception space 6 the seal is compressed, and this produces in the customary elastic material of the seal 7 a force F that is directed in the opposing direction.

This force F works against the adjacent walls, and thus presses the housing wall apart, specifically the receding housing wall 2W\* and the sensor device wall 4W. Inasmuch as the sensor device 4 is located inside the housing wall 2W\*, the distance available for yielding movement is limited. For a seal thus fitted around the sensor device 5 on many sides, particularly in the case of a cylindrical arrangement with an O-ring serving as seal 7, there is ultimately no room at all for this kind of yielding movement. The fitted seal 7 thus secures the sensor device 4 in the housing 4 by means of force F. The sensor-fastening device 8 is thus formed by the seal 7 in interaction with the seal reception space 6 and its walls 2W, 4W\*.

As an alternative or, preferably, as a additional feature, an adjusting device 8 belonging to the sensor-fastening device will serve to secure, and particularly to temporarily fasten, the sensor device 4 in the front-end hole 3 of the housing 2.

The adjusting device 8 exhibits a frontal or facing section which serves as a limiting section 8S for the reception space or, if so desired, as a tightening section 8S. According to a preferred embodiment, an open space remains between the back end of the seal 7 and the limiting section 8S; this space takes the form of a gap 6S, with an open length d6s behind the seal 7.

To secure the sensor device 4 in the front-end hole 3 of the housing 2 the adjusting device 8 is tightened in the forward direction.

According to the alternative embodiment, the adjusting device can be tightened against the seal using its tightening section 8S. Since movement of the seal 7 is limited in this direction by the seal-limiting projection 2A and the seal 7 cannot yield, a pressure force works in an axial direction on the seal 7 thus mounted. This pressure force in the axial direction squeezes the seal 7 together, and the seal 7 is deformed due to its elastic properties. To escape the pressure force in the axial direction the seal 7 is deformed in the radial or lateral direction. In this lateral direction, however, the seal 7 is limited by the receding housing wall 2W\* on one side and by the sensor device wall 4W on the other side. Consequently the seal 7 exerts a bracing force F in the lateral direction against the housing wall, specifically the receding housing wall 2W\* and the sensor device wall 4W.

Instead of the seal-limiting projection 2A, which projects from the housing wall 2W\* into the front-end hole 3, an alternative form provides for a seal-limiting projection that projects from the forward lateral wall 4W of the sensor device 4 toward the further-opened housing wall 2W\*. It is also possible to have an arrangement that involves a sensor device 4 with outer wall(s) whose course is flat in the axial direction, with a corresponding design in the housing wall(s) positioned at a distance thereto. In this case a separate seal-limiting projection would be positioned on the housing wall or on the sensor device wall, in the front area. If the seal-limiting projection is positioned on the front outer circumference of the sensor device, the adjusting device 8 will ideally be assembled or positioned against the seal 7 while the sensor device 4 is secured vis-à-vis the housing by means of, e.g., a separate and temporarily positioned tightening device, thereby assuring that the entire sensor device 4 is not pushed out of the front hole 3 by the protruding seal-limiting projection due to the axially advancing adjusting device 8 in combination with the seal 7.

FIG. 2 shows a modified arrangement, whose description below deals only with components and functional details which differ from the embodiment according to FIG. 1.

Once again a sensor device 4 is secured in a front-end hole 3 of housing 2 by means of a seal 7. The seal 7 is again set between a front seal-limiting projection 2A belonging to the housing 2 and the walls 2W, 4W of the seal reception space 6. The seal 7 is deformed, since its diameter is greater than the lateral length d6r of the seal reception space 6, and the seal 7 exercises a force F in the lateral direction, so that the housing 2 and the sensor device 4 are braced against each other by the housing wall 2W\*, the seal 7, and the sensor device wall 4W.

The adjusting device 8 advantageously exhibits a projecting part 8A which is directed inwardly into the space of the front hole 3 and which forms an inside abutment 8A on the front end. This inside abutment 8A belonging to the adjusting device 8 serves as an abutment for a rear section 4R of the sensor device 4. Due to the distant spacing of the forward abutment area of the inside abutment 8A belonging to the projection of the adjusting device 8 and due to the distance d8 formed by the frontal section of the adjusting device 8 creating the reception space limiting section 8S, the path over which the sensor-fastening device 8 can advance toward the seal 7 is limited with respect to the rear abutment 4R of the sensor device 4. As a result, the remaining gap 6S—or, in an alternative embodiment, the tightening force at work on the seal 7—is limited, and unintentional squeezing and damage to the seal 7 due to excessive axial force on the seal 7 is avoided.

FIG. 3 shows another variant of a pressure sensor, with basically the same effective principle as in the embodiments already described.

A pressure sensor 1 is again depicted, which is inserted into the wall of a receptacle 9. The front end of the pressure sensor, with the sensor device 4, projects into the interior of the receptacle 9, and the front end of the pressure sensor, or its housing 2, and of the sensor device 4 will preferably terminate at and become flush on its front side with the inner wall of the receptacle 9. Thus a pressure p, which prevails in the interior of the receptacle 9, is at work on the sensor device 4. To secure the housing 2 in the depicted exemplary embodiment to the receptacle 9 the housing 2 is installed in a welded fixture or a welded bushing 10, which is installed in the wall of the receptacle 9. Threaded bushings are also known in the prior art. The housing 2 is arrested within the welded bushing 10 by a screw 11, which grips a rearward housing section and presses the front of the housing 2 into the welded bushing 10. The fastening screw 11 has an outer thread which engages with the corresponding inner thread of the welded bushing 10. The front end of the fastening screw 11 and the back end of the housing 2 will preferably be separated by an interposed ring 13, specifically a sealing ring or other ring of elastic material. On it front end the welded bushing 10 has an inwardly pointing projection 10b, which exhibits an abutment for a circumferential joint 2F in the outer front housing 2. The abutment 10b keeps the housing 2 from advancing into the interior of the receptacle 9. A seal, particularly in the form of an O-ring, is inserted between the joint 2F and this abutment 10A to expediently cushion and close the seal.

The sensor device 4 is again secured inside of the housing by means of a seal 7, which again is fixed in a seal reception space 6. An adjusting device 8 belonging to the sensor-fastening device is tightened in the direction of the seal 7 by a screw that is positioned on the back of the fastening device and that has a circumferential thread; the adjusting device 8 is arrested inside the housing 2. The circumferential thread of this screw 8B engages with the corresponding inner thread in the back of the housing 2.

The back housing section 12 will ideally be positioned behind the screw 8b, which forms the terminal part of the adjusting device 8. The housing section 12 exhibits components to control and operate the sensor device 4. Among these components specifically is an electronic evaluating unit 14, which is contacted by electrical connections to the sensor device 4, and a pressure-equalizing device 15, if so required by the design of sensor device 4.

The depicted pressure sensor 1, its components, and other fastening elements, such as the welded flange 11, will ideally have a cylindrical construction. In principle, however, some or all of the individual components can have a different shape, for example a square or multi-angular cross-section. In addition, individual sealing elements, placed at a distance from each other if necessary, can be employed instead of the circumferential seal 7.

FIG. 4A again depicts another embodiment, which has reference to the embodiments described above. A sensor device 4 is again frontally positioned on a housing 2, and in an manner already described the sensor device 4 is fixed in the housing 2 by means of a circumferential seal 7, specifically in a seal reception space 6 exhibiting a small lateral range d6r. The depicted adjusting device again has an inside joint that forms an inside abutment 8A engaging with the circumferential area of the back 4R of the sensor device, such that the adjusting device 8 can be tightened to a limited degree against the sensor device in the direction of the seal 7. In addition, the outer circumference of the adjusting device 8 has a joint 8V on its front side which forms a forward abutment engaging with an inside projection 2V that belongs to the housing and that serves as a counter-abutment. As a result, the adjusting device 8 also can only be advanced to a limited degree inside the housing 2 and, relative to the housing, only to a limited degree toward the front. This also serves to restrict the open gap 6S behind the seal 7, as well as to limit the advancing path of the adjusting device 8, and also the sensor device 4, toward the front-end of the pressure sensor, or the front-end of the housing 2. Depending on the embodiment chosen, this arrangement can be omitted.

Also depicted is the joint 2F in the front outer circumference of the housing. Another seal is positioned here. FIG. 4B shows in enlarged form a sensor device 4, which will ideally consist of a rear sensor device base 4A and a front pressure sensor diaphragm 4B. On the back there are again outlets for an electrical connection to the electronic evaluating unit, and a pressure-equalizing line for the pressure-equalizing device on the sensor device 4.

The dimensions for an especially preferred embodiment are given in the figures, specifically FIGS. 3, 4a, and 4B, without limiting the embodiments that can be realized. Thus the distance d8 between the front tightening section and the inside abutment 4R of the adjusting device 8 will ideally be 2 mm. The height d6 of the sealing reception space 6, i.e., its axial length, will ideally equal. 1.5 mm or more when the pressure sensor is assembled. The seal positioned within the space will ideally consist of an O-ring whose diameter is greater than or equal to 1 mm. The width d6r, or radial length, of the seal reception space 6 will ideally be less than the width of the seal 7, and thus more or less than 1 mm in the present case. When the sensor device 4 has an axial length or height d4 of 4.5 mm and the seal limiting projection 2A has an axial length d2A of 1 mm, the sensor device 5 in this especially preferred embodiment will be braced in the housing and will be flush on its front end. Given an axial length d4 of 4.5 mm, the sensor device 4 itself could be formed by sensor device base with an axial length d4A of 4.3 mm and a diaphragm 4B with a thickness d4B of 0.2 mm. While alternative embodiments may advantageously exhibit greater values, in principle it is possible to realize embodiments whose dimensions are smaller than those indicated.

With the depicted embodiments it is possible to assemble a ceramic capacitive pressure sensor element 4, belonging to a pressure sensor, with a preferred outer circumference of 17.5 mm, in conjunction with a pressure measuring device having a frontally flush sensor device 4 and a fastening diameter for the pressure sensor, or for the outer circumference of the pressure sensor, with a value starting at 22 mm, given a base of sufficient height. Given a frontally flush installation of the sensor device 4 into the sensor fastening device, a sufficiently deep joint of 2 mm or more is suitable for this example. A seal reception space 6 for the seal 7—which seal 7 has a thickness of 1 mm or more in the preferred embodiment—is formed radially around the sensor device 4 in the housing 2, with a height d6 of 1.5 mm for the seal reception space 6. In addition, the preferred embodiment exhibits a seal limiting projection 2A that is directed forward and inward and that has a axial length d2A of 1 mm, so that the sensor device 4, including the sensor device base 4A, can have a height or axial length d4 of 4.5 mm.

What is claimed is:

1. A pressure sensor (1) with
    a housing (2),
    a sensor device (4),
    a sensor fastening device for fastening the sensor device (4) onto and/or in the front area of the housing (2), and
    a seal (7) for sealing the transitional area between the housing (2) and the sensor device (4), where
    the housing (2) exhibits an inside housing wall (2W) and the sensor device (4) exhibits an outside sensor device wall (4W), such that the housing wall (2W) and the sensor device wall (4W) run in adjacent fashion one to the other and exhibit between the housing wall (2W) and the sensor device (4W) a reception space (6) for receiving the seal (7),
    wherein
    the sensor fastening device exhibits the reception space (6) and the seal (7), and the seal (7) between the housing wall (2W, 2W*) and the sensor wall (4W) is mounted in such a way that the seal (7) creates an effective force (F) in the direction of the housing wall (2W, 2W*) and the sensor wall (4W) and the two are braced against each other by the force (F).

2. A pressure sensor according to claim 1, in which the housing exhibits a seal-limiting projecting part (2A), which points forward and inward toward the sensor device wall (4W) and which serves an abutment for the seal (7) in the forward direction, and/or the sensor device (4) exhibits a forward seal-limiting projecting part in the direction of the housing wall.

3. A pressure sensor according to one of the preceding claims in which a length (d6r) of the reception space (6) for the seal (7) running in the lateral direction between the housing wall (2W*) and the sensor device wall (4W) is smaller than the corresponding length of the unbraced seal (7).

4. A pressure sensor according to a preceding claim, in which rearwards of the seal (7) set between the housing wall (2W, 2W*) and the sensor device wall (4W) there remains an open space (6S) facing adjacent housing components in the back.

5. A pressure sensor according to a preceding claim, in which the sensor fastening device had an adjusting device (8, 8B) exhibiting a reception space limiting section (8S), which section, at least in part, can be adjustably positioned between the housing wall (2W*) and the sensor device wall (4W) in the direction of the seal (7).

6. A pressure sensor according to claim 5, in which the adjusting device (8, 8B) has an outer thread that can be screwed into an inner thread of the housing (2), particularly of the housing wall (2W), so that the outer thread and the inner thread engage with each other in such a way that the reception space limiting section (8S) of the adjusting device (8) is moved toward the seal, and specifically can be tightened against the seal (7) as a tightening section (8S).

7. A pressure sensor according to claim 5 or 6, in which the adjusting device (8) has an inside abutment (8A) that is coupled to the housing (2) and that rests against a back section (4R) of the sensor device (4) in order to limit the insertion depth of the sensor device (4) into the housing (2).

8. A pressure sensor according to a preceding claim, in which the adjusting device (8) has an outside abutment (8V) that is positioned against an inside fastening device limiting projection (2V) belonging to housing, in order to limit the advance of the adjusting device (8) in the forward direction.

9. A pressure sensor according to a preceding claim, in which the sensor device (4) has a ceramic capacitive pressure sensor element with an outer diameter that is smaller than or equal to 18 mm.

10. A pressure sensor according to a preceding claim, in which the housing (2) has an outer diameter of 20–25 mm, particularly 22 mm.

11. A pressure sensor according to a preceding claim, particularly claim 3, in which
the reception space (6) for the seal (7) is higher in the axial direction than the axial length of the seal (7), particularly by a factor of 1.5, an inside abutment (8A) belonging to the sensor fastening device (8) opposite a front tightening section (8S) for tightening the seal (7) in the axial direction is positioned at a distance that is larger by a certain length (d8) than the corresponding dimension of the seal (7), particularly larger by 2 mm or more, and an axial length (d4) from the inside abutment (8A) to the front tightening section (8S) of the sensor fastening device (8), plus the axial length (d6) of the seal reception space (6) for the seal (7), plus a length (d2A) of a seal limiting projection (2A) taken together are equal to the axial length (d4) of the sensor device (4).

12. A process for mounting a pressure sensor (1) in which
a sensor device (4) is positioned on the front of, or in, a housing (2), a seal (7) is installed in a reception space (7) between an inside wall (2W*) of the housing (2) and an adjacent lateral sensor device wall (4W) of the sensor device (4), and the sensor device (4) is secured to the housing (4),
wherein
the seal (7) is given dimensions appropriate to the dimensions of a reception space and is pressed into the reception space (7) between the sensor device wall (4W) and the housing wall (2W*), so that the seal (7) exerts a pressure force (F) on the sensor device (4) and the housing (2), such that the two are braced against each other.

* * * * *